US008874119B2

United States Patent
Zhou et al.

(10) Patent No.: US 8,874,119 B2
(45) Date of Patent: Oct. 28, 2014

(54) METHOD AND DEVICE FOR MACHINE TYPE COMMUNICATION MONITORING PROCESSING

(75) Inventors: Yanfei Zhou, Beijing (CN); Chunshan Xiong, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 49 days.

(21) Appl. No.: 13/638,917

(22) PCT Filed: Jun. 13, 2011

(86) PCT No.: PCT/CN2011/000981
§ 371 (c)(1),
(2), (4) Date: Oct. 1, 2012

(87) PCT Pub. No.: WO2011/157055
PCT Pub. Date: Dec. 22, 2011

(65) Prior Publication Data
US 2013/0095837 A1    Apr. 18, 2013

(30) Foreign Application Priority Data
Jun. 13, 2010    (CN) .......................... 2010 1 0207652

(51) Int. Cl.
*H04W 36/00*    (2009.01)
*H04W 36/32*    (2009.01)
*H04W 64/00*    (2009.01)
*H04W 4/02*    (2009.01)
*H04W 4/00*    (2009.01)
*H04W 60/04*    (2009.01)
*H04L 29/08*    (2006.01)
*H04W 76/02*    (2009.01)

(52) U.S. Cl.
CPC ............. *H04W 36/32* (2013.01); *H04L 67/125* (2013.01); *H04W 64/00* (2013.01); *H04W 76/022* (2013.01); *H04W 4/021* (2013.01); *H04W 4/005* (2013.01); *H04W 60/04* (2013.01)
USPC ...................... 455/440; 455/456.4; 455/456.1; 455/466; 455/422.1

(58) Field of Classification Search
CPC ...... H04W 36/32; H04W 36/08; H04W 64/00
USPC ................. 455/440, 456.4, 456.1, 466, 422.1
See application file for complete search history.

(56) References Cited

U.S. PATENT DOCUMENTS

2004/0252015 A1 * 12/2004 Galperin et al. ............. 340/5.64
2007/0165573 A1 *  7/2007 Hietalahti ..................... 370/331
2010/0057485 A1    3/2010 Luft

FOREIGN PATENT DOCUMENTS

CN        101730123 A    6/2010

OTHER PUBLICATIONS

PCT International Search Report, dated Sep. 22, 2011, PCT Appln. No. PCT/CN2011/000981, 4 pages.

(Continued)

*Primary Examiner* — Nghi H Ly
(74) *Attorney, Agent, or Firm* — Foley & Lardner LLP

(57) ABSTRACT

The present invention discloses a method and device for machine type communication (MTC) monitoring process, and includes: an MTC determines the first location which an MTC device (MD) is allowed to be at and the event report needing to be performed when the MD is not at the first location; the MTC server sends the information of the first location and the information of the event report to the MD; the MD receives the information of the first location and the information of the event report sent from the MTC server; and after detecting that the MD is not at the first location according to the information of the first information, the MD reports the event report to the MTC server. The present invention enhances the monitoring process with finer-granularity and can reduce the interfaces and operations between other network nodes and a Home Subscriber Server (HSS)/Home Location Register (HLR), and maintains the stability of HSS/HLR.

19 Claims, 9 Drawing Sheets

(56) References Cited

OTHER PUBLICATIONS

3GPP, Service requirements for Machine-type Communications (MTC), Stage 1 (Release 10), 3GPP TS 22.368 v10.0.0, Apr. 1, 2010, sections 7.2.8, 7.2.11, Annex A p. 22, paragraphs 1-3.
3GPP, System Improvements for Machine-Type Communications, (Release 10), 3GPP TR 23.888 V0.4.1, Jun. 4, 2010, section 6.12.
ZTE: "MTC Device Assisted Monitoring", 3GPP Draft; S2-102241, $3^{rd}$ Generation Partnership Project (3GPP), Mobile Competence Centre; 650, Route De Lucioles; F-06921 Sophia-Antipolis Cedex; France, vol. SA WG2, No. Kyoto; 20100510, May 4, 2010, XP050434445, [retrieved on May 4, 2010].
Panasonic et al: "MTC Device Assisted Monitoring", 3GPP Draft; S2-102931_REV_Device_Assisted_Monitoring_R2, $3^{rd}$ Generation Partnership Project (3GPP), Mobile Competence Centre; 650, Route De Lucioles; F-06921 Sophia-Antipolis Cedex; France, vol. SA WG2, No. Kyoto; 20100510, May 14, 2010, XP050435022, [retrieved on May 14, 2010].
"$3^{rd}$ Generation Partnership Project; Technical Specification Group Services and System Aspects; System Improvements for Machine-Type Communications; (Release 10)", 3GPP Standard; 3GPP TR 23.888, $3^{rd}$ Generation Partnership Project (3GPP), Mobile Competence Centre; 650, Route Des Lucioles; F-06921 Sophia-Antipolis Cedex; France, No. V0.4.1, Jun. 3, 2010, pp. 1-53, XP050441503, [retrieved on Jun. 3, 2010].
CATT: "Detecting and Reporting by MD", 3GPP Draft; S2-111809, $3^{rd}$ Generation Partnership Project (3GPP), Mobile Competence Centre; 650, Route Des Lucioles; F-06921 Sophia-Antipolis Cedex, France, vol. SA WG2, Meeting No. 84. Bratislava; 20110411, Apr. 6, 2011), XP050524697, [retrieved on Apr. 6, 2011].
EPO Office Communication dated Jun. 20, 2013, 8 pages.

* cited by examiner

METHOD AND DEVICE FOR MACHINE TYPE COMMUNICATION MONITORING PROCESSING

This application is a U.S. National Stage of International Application No. PCT/CN2011/000981, filed 13 Jun. 2011, designating the United States, and claiming the benefit of Chinese Patent Application no. 201010207652.4, filed with the Chinese Patent Office on Jun. 13, 2010 and entitled "Method of and apparatus for machine type communication monitoring process", which is hereby incorporated by reference in its entirety.

FIELD OF THE INVENTION

The present invention relates to the field of machine type communication and particularly to a method of and apparatus for a machine type communication monitoring process.

BACKGROUND OF THE INVENTION

Machine Type Communication (MTC) refers to communication between machines over a communication network of a mobile operator. The following several concepts are defined for machine type communication:

MTC Device (MD): A MTC Device refers to a User Equipment dedicated to machine type communication in a communication network, e.g., a remote meter reading device, a video surveillance device, etc. The MTC Device is a special type of communication terminal without human interaction. The 3GPP defines different MTC characteristics, e.g., low mobility, time controlled, etc., for different MD characteristics.

MTC server: A MTC server refers to a device in communication with the MTC device over the communication network and is equivalent to a server, e.g., a server of an intelligent meter reading system, a server of an intelligent public transportation system, etc.

MTC user: A MTC user uses a service provided by the MTC server.

FIG. 1 is a schematic architectural diagram of machine type communication illustrating an architectural diagram of communication between an MD, an MTC server and a 3GPP system. In machine type communication, the $3^{rd}$ Generation Partnership Project (3GPP) system provides transmission and communication services, e.g., a bearer service, an IP Multimedia System (IMS), short message service, etc., for communication between the MD and the MTC server, and traditional communication modes are optimized to some extent in view of characteristics of machine type communication.

Since the machine type communication device typically operates in an "unmanned" status and may be deployed in some highly risky area (susceptible to theft or breakage), the 3GPP proposes a demand for MTC monitoring (where the network monitors the MD for a specific event and reports the event to the MTC server or the MTC user upon detection thereof) in order to secure the use of such a kind of MD. The demand for MTC monitoring defined in 3GPP TS 22.368 is particularly as follows:

1. A network operator shall be able to detect the following events:
   1) The device has a behavior in no compliance with an activated MTC characteristic (for example, the location of an MD with the characteristic of low mobility is updated frequently);
   2) An access point is changed (e.g., an access outside a restricted area);
   3) A match relationship between the terminal device and a Universal Integrated Circuit Card (UICC) is changed; and
   4) A connection is lost.
2. The MTC user shall define which of the foregoing events will be monitored.
3. The network shall be able to perform the following operations upon occurrence of an monitoring event:
   1) An alarm message is provided to the MTC user or the MTC server; and
   2) A service provided to the MD is restricted (for example, an allocated resource is reduced, etc.);
4. The operation(s) subsequent to occurrence of the event shall be defined by the MTC user; and
5. The MD shall be able to transmit a message to the MTC server to indicate an event for which a detection method is beyond the reach of the 3GPP.

Detection and reporting methods are proposed in 3GPP TS 23.888 respectively for the foregoing events. An event to be detected and a relevant rule (e.g., an allowed location area) are configured and also an operation to be performed by the network (for example, the MD is detached from the network) upon occurrence of the configured event can be configured in subscription data of the MD as a basic of detection and reporting.

TS 23.888 proposes a method of detecting an event of "change in point of attachment" to be primarily performed by a core network control node which is a Mobility Management Entity (MME) in an Long Term Evolution (LTE) system and a Serving GPRS Support Node (SGSN) or a Mobile Switching Center (MSC) in a Universal Mobile Telecommunications System (UMTS).

TABLE 6.10.2-1

SGSN/MME Based Detection

| Monitoring an Event | Procedures |
|---|---|
| Monitoring the association between the MTC Device and the UICC | 1> The SGSN/MME asks for the MTC Device IMEI (e.g. Identity procedure).<br>2> The SGSN/MME checks whether the IMEI provided by the device is the same as the configured IMEI.<br>3> If not, then the SGSN/MME shall trigger reporting. |
| Monitoring the alignment of the MTC feature | 1> The SGSN/MME checks whether the MTC Device behavior is aligned with the activated MTC features for the device.<br>2> If not (e.g. the MTC Device with a low mobility feature performs an RAU/TAU or handover procedure frequently), then the SGSN/MME shall trigger reporting. |
| Monitoring a change in the point of attachment | 1> The SGSN/MME checks whether there is a change of point of attachment.<br>2> If so, then the SGSN/MME shall trigger reporting. |
| Monitoring a loss of connectivity | 1> The SGSN/MME checks whether the MTC Device is offline.<br>2> If so, then the SGSN/MME shall trigger reporting. |

FIG. 2 illustrates a procedure of MME/SGSN based detection and reporting in the prior art, where a Core Network (CN) node is an MME in an LTE system and an SGSN or an MSC in a UMTS system. A user subscription data server is an Home Subscriber Server (HSS) in an Evolved Packet System (EPS) and a Home Location Register (HLR) in a UMTS system, and an event to be monitored (a change in point of attachment as an example) has been configured in subscription data, and then the flow can include:

Step 201: An MD initiates an Attach Request for an access to the network.

Step 202: The CN node transmits a Location Update Request to the user subscription data server.

Step 203: The user subscription data server returns to the CN node a Location Update Response including the subscription data of the MD, which includes a definition of the monitoring event, a default operation upon occurrence of the event, etc.

Step 204: The CN node returns an Attachment Accept to the MD, and the MD accesses the network.

Step 205: The CN node monitors in response to the instruction contained in the subscription data.

Step 206: The CN node reports the event to an MTC server or an MTC user upon occurrence of the event.

Step 207: If the MTC server or the MTC user is specified to instruct the CN node regarding a subsequent action, the MTC server/the MTC user returns an action instruction. If the MTC server/user returns no instruction, then the CN node performs the default action in the subscription data.

Step 208: The CN node performs the action, for example, detaching the MD from the network, etc.

In the demand for MTC monitoring, existing detection of "a change in point of attachment" is generally performed by the network, e.g., SGSN/MME based detection. This method has the following drawbacks:

1) There is some impact on the HSS/HLR: the event information is configured in the subscription data of the MD, and the data in the HSS/HLR has to be synchronized rapidly upon occurrence of a change of event (for example, the allowed access area is updated, etc.). In addition to this, an interface between the MTC server/user and the HSS/HLR has to be further added and a relevant operation flow has to be defined. However the data in the HSS/HLR as a subscription data server shall be altered as infrequently as possible and also interfaces and interaction between the other nodes and the HSS/HLR in the network shall be reduced as many and much as possible to thereby ensure stability of the HSS/HLR; and 2) The granularity of network-based method of detecting a "change of attachment" is not fine-grained. When the terminal enters an idle mode, the core network can know information of the location of the terminal only at the granularity of a location area (a list of routing areas or tracking areas) in the prior art, and the network can not perform the function of detecting a "change of attachment" in the existing method if the terminal is allowed to attach to a small area, for example one or more cells.

SUMMARY OF THE INVENTION

The invention addresses the technical problem of providing a method of and apparatus for a machine type communication monitoring process so as to perform an MTC monitoring process on an MD.

There is provided in an embodiment of the invention a method of a Machine Type Communication (MTC) monitoring process, which includes the steps of:

an MD receiving information of a first location and information of an event report transmitted from an MTC server, wherein the first location is a location where the MD is allowed to reside, and the event report is an event report to be made when the MD is absent from the first location; and the MD reporting the event report to the MTC server upon detecting absence from the first location according to the information of the first location.

There is provided in an embodiment of the invention a method of an MTC monitoring process, which includes the steps of:

an MTC server determining a first location where an MD is allowed to reside and an event report to be made when the MD is absent from the first location; and the MTC sever transmitting information of the first location and information of the event report to the MD.

There is further provided in an embodiment of the invention another method of a Machine Type Communication (MTC) monitoring process, which includes the steps of:

an MTC Device, MD, receiving information of a first location and information of an event report transmitted from an MTC server, wherein the first location is a location where the MD is allowed to reside, and the event report is an event report to be made when the MD is present at the first location; and the MD reporting the event report to the MTC server upon detecting presence at the first location according to the information of the first location.

There is further provided in an embodiment of the invention another method of an MTC monitoring process, which includes the steps of:

an MTC server determining a first location where an MD is allowed to reside and an event report to be made when the MD is absent from the first location; and the MTC sever transmitting information of the first location and information of the event report to the MD.

There is provided in an embodiment of the invention a machine type communication device including:

a receiving module configured to receive information of a first location and information of an event report transmitted from an MTC server, wherein the first location is a location where the MD is allowed to reside, and the event report is an event report to be made when the MD is absent from the first location;

a monitoring module configured to monitor whether the MD is absence from the first location according to the information of the first location; and a transmitting module configured to report the event report to the MTC server upon detecting absence of the MD from the first location.

There is provided in an embodiment of the invention a machine type communication server including:

a determining module configured to determine a first location where an MD is allowed to reside and an event report to be made when the MD is absent from the first location; and a transmitting module configured to transmit information of the first location and information of the event report to the MD.

There is further provided in an embodiment of the invention another machine type communication device including:

a receiving module configured to receive information of a first location and information of an event report transmitted from an MTC server, wherein the first location is a location where the MD is allowed to reside, and the event report is an event report to be made when the MD is present at the first location;

a monitoring module configured to monitor whether the MD is present at the first location according to the information of the first location; and a transmitting module configured to report the event report to the MTC server upon detecting presence of the MD at the first location.

There is further provided in an embodiment of the invention another machine type communication server including:

a determining module configured to determine a first location where an MD is allowed to reside and an event report to be made when the MD is present at the first location; and a transmitting module configured to transmit information of the first location and information of the event report to the MD.

Advantageous effects of the invention are as follows:

In the procedure of the MTC monitoring process in the technical solution according to the embodiments of the invention:

For an MTC server, the MTC server transmits information of a first location where an MD is allowed to reside and information of an event report to be made when the MD is absent from the first location after determining the first location and the event report.

For the MD, the MD receives the information of the first location and the information of the event report transmitted from the MTC server; and thus the MD reports the event report to the MTC server upon detecting absence of the MD from the first location according to the information of the first location.

An event to be detected is transmitted from the MTC server to the MD without any modification to subscription data of the MD, and also the MD is updated from the MTC server upon change of the event to be detected, so that as compared with the existing SGSN/MME based detection method, the present solution eliminates the need of an interface between an MTC server and an HSS and also the need for the HSS/HLR to notify a core network node of the updated event to be detected upon change to the event, thereby reducing interfaces and interaction between other network nodes and the HSS/HLR and maintaining the stability of the HSS/HLR. Furthermore the present solution can detect a change of access point at a finer granularity (e.g., the granularity of a cell) to thereby address the problem of a larger detection granularity in an idle mode in the SGSN/MME based detection method.

DETAILED DESCRIPTION OF THE EMBODIMENTS

The inventors have identified during making of the invention:

There is defined in 3GPP TS 23.271 a Location Service (LCS)-based method in which a UE monitors an event of "change of area", particularly as follows: a LCS client issues a LCS Request to the network for making a report when the UE enters, leaves or resides in a target location area, the network accepts the request and transmits the target location area and the definition of an event to the UE in a short message, the UE makes a report to the network upon detecting the event (entering, leaving or residing in the designated location area), and then the network makes a report to the LCS client.

It will be described below:

1. The LCS client indicate in a LCS Request message that the requested event is the type of "change of area" and also gives the representation of the target location area, which can be a geographical area defined in TS 23.032 or a geographical area represented in an E.164 country code or an area identified by a Public Land Mobile Network (PLMN) Identifier (ID) or a geographical district (e.g., a city name) or the like.

2. A Gateway Mobile Location Center (GMLC) in the network receives the LCS Request from the LCS client and can translate the destination location area in the request into a cell identifier (cell ID), a Location Area ID (LAI), a Routing Area ID (RAI), a PLMN ID, etc., of the area.

3. The GMLC interacts with the UE in a short message and transmits relevant information of the event of "change of area" (e.g., the location area ID or geographical coordinates of the target area, a report condition, etc.) to the UE in the short message, that is, the GMLC has the capability to translate the information in the LCS Request into the contents of a short message and interact with a Short Message Service Center (SM-SC) in this solution.

4. The GMLC activates an application in a (U)SIM (USIM stands for UMTS Subscriber Identity Module, and UMTS stands for Universal Mobile Telecommunication System) by a short message transmitted from the SM-SC and transmits an event of "change of area", where the application interacts with the terminal device, i.e., a Mobile Termination (MT), through a (U)SIM Application Toolkit (USAT)) command to instruct the terminal to monitor the UE for entering, leaving or residing in the target location area. The terminal makes a report to the (U)SIM upon occurrence of the event, and the (U)SIM further makes a report to the GMLC through the SM-SC in a short message.

Figure 1:
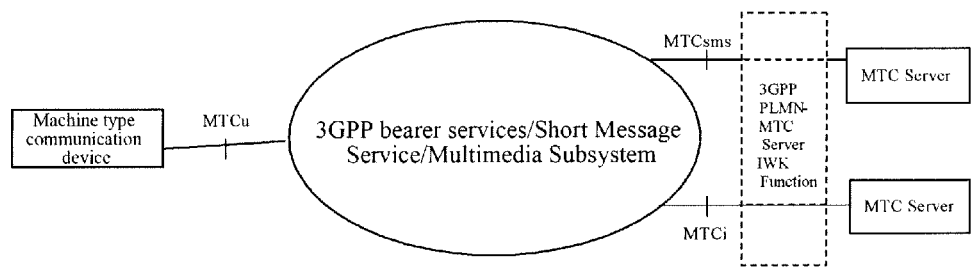
FIG. 1 is a schematic architectural diagram of machine type communication in the prior art.
Figure 2:
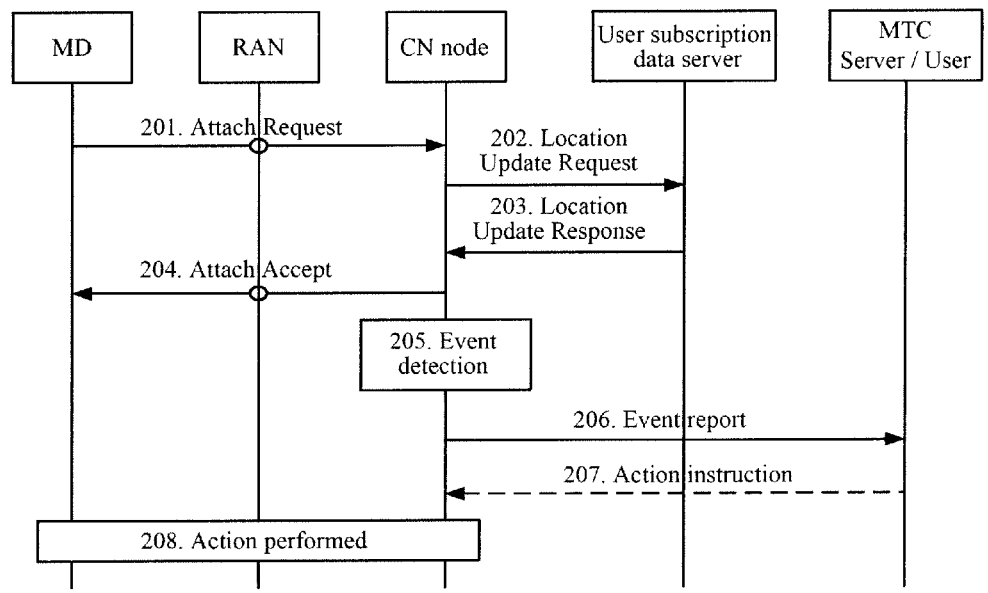
FIG. 2 is a schematic diagram of a procedure of MME/SGSN based detection and reporting in the prior art.
Figure 3:
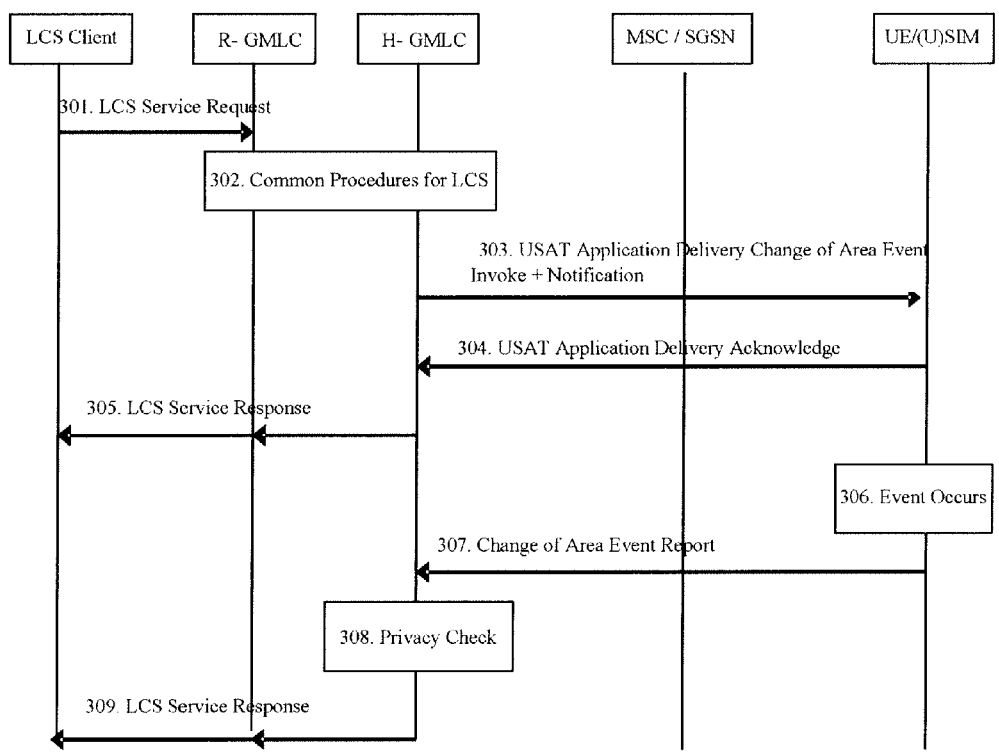
FIG. 3 is a schematic diagram of a procedure to download a USAT application and detect an event in an embodiment of the invention.

FIG. 3 is a schematic diagram of a procedure to download a USAT application and monitor an event, and the existing LCS Request of the type of "change of area" is applicable only to 2G and UMTS system. A flow thereof is as illustrated in FIG. 3, where a Roaming GMLC (R-GMLC) is a GMLC in a network of a LCS client, a Home GMLC (H-GMLS) is a GMLC in a home network of a located UE, and a core network node is a Mobile Switching Center (MSC) in a 2G system and an SGSN or an MSC in a UMTS system. A Short Message Service Center (SM-SC) is omitted in the figure, and the flow can include:

Step 301: The LCS client transmits to the R-GMLC a LCS Request message indicating a type of event as "change of area" and giving a description of a target location area and a report condition (entering, leaving or residing in the target location area).

Step 302: This step includes common procedures for LCS, which generally involves interaction between the GMLCs.

Step 303: The H-GMLC upon reception of the LCS Request message may translate the target location area in the message into an identifier (e.g., a cell ID, an LAI, etc.) or geographical coordinates and transmit a short message, i.e., an event of change of area, to a UE/(U)SIM through the SM-SC and the MSC/SGSN.

Step 304: The UE returns a response to the H-GMLC.

Step 305: The H-GMLC and the R-GMLC return a response to the LCS client;

Step 306: The (U)SIM instructs the user equipment to monitor the event of change of area, that is, whether the UE enters, leaves or resides in the target location area, upon reception of the event in the step 303.

Step 307: The user equipment notifies the (U)SIM card and transmits an event report to the H-GMLS through the SM-SC upon occurrence of the event.

Step 308: The H-GMLC performs a privacy check.

Step 309: The H-GMLC transmits an event report to the LCS client through the R-GMLC if the privacy check is passed.

In this way, user equipment-based detection of a "change of area" can be performed. Since the user equipment can acquire conveniently the identifier of a location area where it currently resides (e.g., a cell ID, an LAI, etc.), this approach can simplify operations at the network side.

In the demand for MTC monitoring, existing detection of "a change in point of attachment", is generally performed by the network, for example the SGSN/MME-based detection. A drawback of this solution lies in some impact on an HSS/HLR: event information is configured in subscription data of the MD, and data in the HSS/HLR has to be synchronized rapidly upon occurrence of a change of event (for example, an allowed access area is updated, etc.). In addition to this, an interface between the MTC server/user and the HSS/HLR has to be further added and a relevant operation flow has to be defined. However the data in the HSS/HLR as a subscription data server shall be altered as infrequently as possible and also interfaces and interaction between the other nodes and the HSS/HLR in the network shall be reduced as many and much as possible to thereby ensure stability of the HSS/HLR.

Moreover the network can know the location where the user equipment resides only at the granularity of a list of RAs or TAIs but can not acquire the information of the cell where the user equipment currently resides and other more detailed information of the location of the user equipment when the user equipment enters an idle mode in the existing system, thus increasing the complexity of the network in the method where the event is detected by the network. On the other hand, the user equipment can select and reselect a cell even if it is in an idle mode and thus can acquire information of the location where it currently resides conveniently, but this characteristic of the user equipment has not been well utilized in the network-based detection method.

In view of the foregoing drawbacks in the prior art and in combination with the LCS technology, there is proposed in embodiments of the invention a solution to detection by an MD of an event of "change in point of attachment", particularly as follows: an MTC server/an MTC user configures information of an allowed location of an MD, and the MTC server transmits the information of the allowed location and information related to an event report to the MD in a short message after the MD is attached to the network and registers with the MTC server. The MD stores the allowed location information and monitors whether a defined event occurs. The MD transmits a report to the MTC server in a short message upon occurrence of the event to thereby satisfy a demand for user equipment-based MTC monitoring. Specific embodiments of the invention will be described below with reference to the drawings.

The description will be given respectively for implementations at the MTC server side and at the MD side, but this will not mean that they must cooperate for an implementation, and indeed, issues at the MTC server side and at the MD side can also be addressed respectively in the separate implementations at the MTC server and at the MD although a better technical effect can be achieved when both of them cooperate.

In an implementation, firstly an MTCsms interface is enabled between the MTC server and an SM-SC to perform a function of a Short Message Entity (SME), i.e., a function to translate information of an event to be detected into a format required for a short message.

Secondly the SME is required to be enabled in the MD to have both a function to transmit and receive a short message and a function to download a (U)SIM application and to interact with a Mobile Terminal/Termination (MT) in a USAT command.

Finally an allowed location area of the MD includes but will not be limited to any one or combination of the following several granularities dependent upon different settings by the MTC server/user: (1) a cell level (e.g., {cell ID a, cell ID b, . . . }); (2) a Tracking Area (TA) level (e.g., {TA_1, TA_2}); (3) possibly geographical location information (e.g., some longitude and latitude) for the MD with a Global Positioning System (GPS) function; (4) a Routing Area (RA) level; and (5) a Location Area (LA) level. Location areas can also be combined due to different allowed location areas of the MD and different division of the location areas in different systems of hybrid networking.

In an implementation, the MTC server/user can decide a setting as required in practice, for example, dependent upon the size of an allowed location area of the MD.

Figure 4:
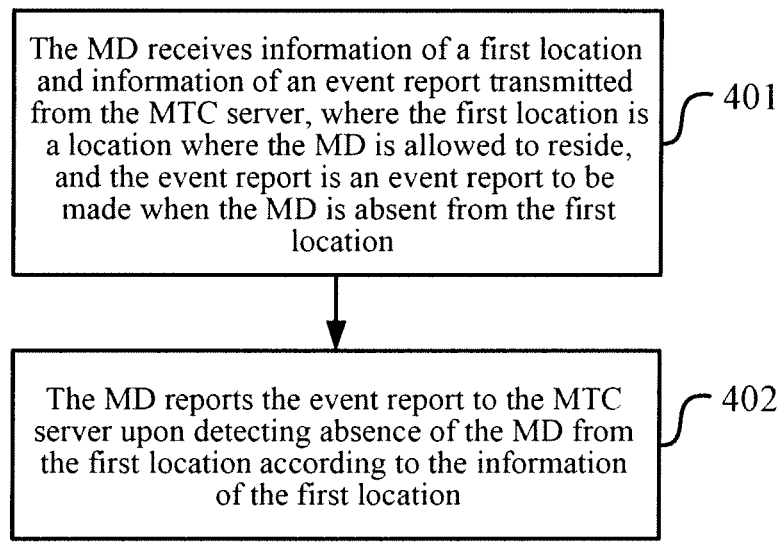
FIG. 4 is a schematic flow chart of performing a method of an MTC monitoring process at the MD side in an embodiment of the invention.

An implementation at the MD side can be as follows:

FIG. 4 is a schematic flow chart of performing a method of an MTC monitoring process at the MD side, which, as illustrated, can include the following steps:

Step 401: The MD receives information of a first location and information of an event report transmitted from the MTC server, where the first location is a location where the MD is allowed to reside, and the event report is an event report to be made when the MD is absent from the first location; and Step 402: The MD reports the event report to the MTC server upon detecting absence of the MD from the first location according to the information of the first location.

The MD can report the event report to the MTC server in numerous ways, for example, in a short message or signaling or in another user plane based method or like. Preferably the MD receives the information of the first location and the information of the event report transmitted from the MTC server particularly in a short message; and the MD reports the event report to the MTC server in a short message.

In an implementation, the MD can receive the information of the location and the information of the event report transmitted from the MTC server after registering with the MTC server in a Packet Data Protocol (PDP) context activation procedure in a UMTS system; or after registering with the MTC server after an attachment procedure in an LTE system; or after registering with the MTC server after a Packet Data Network (PDN) connection request procedure in an LTE system.

In an implementation, there can be further included that:

The MD receives information of a second location transmitted from the MTC server, where the second location is a location where the MD is allowed to reside, different from the first location; and The MD updates the information of the first location with the information of the second location.

The information of the second location is transmitted for the purpose of updating the information of the first location, for example, the MTC server can instruct again the MD to update the allowed location area upon a change to the allowed location area of the MD.

In an implementation, the MD reports the event report to the MTC server upon detecting absence of the MD from the first location according to the information of the first location particularly as follows:

The MD reports the event report to the MTC server upon detecting absence of the MD from the first location according to the information of the first location in a cell selection or reselection procedure.

In an implementation, the MD can report the event report to the MTC server as follows:

The MD reports the event report directly to the MTC server; or

The MD reports the event report to the MTC server through another device.

An implementation of direct reporting can be readily understood, and the function to report the event report to the MTC server can alternatively be performed by another network node, that is, the MD makes a report to the other network node device upon occurrence of the event to be detected, for example, notifies in signaling the other network node device that the MD has been out of the allowed location area, and then the other network node device further makes a report to the MTC server. In the implementation, monitoring is still performed by the MD, but an entity initiating the event report may not necessarily be performed by the MD.

Figure 5:
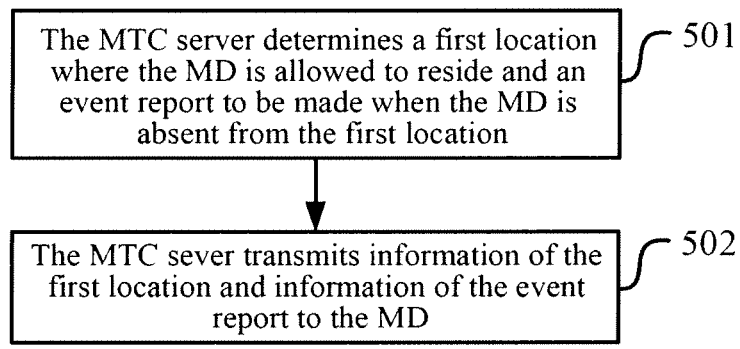
FIG. 5 is a schematic flow chart of performing a method of an MTC monitoring process at the MTC server side in an embodiment of the invention.

An implementation at the MTC server side can be as follows:

FIG. 5 is a schematic flow chart of performing a method of an MTC monitoring process at the MTC server side, which, as illustrated, can include the following steps:

Step 501: The MTC server determines a first location where the MD is allowed to reside and an event report to be made when the MD is absent from the first location; and Step 502: The MTC sever transmits information of the first location and information of the event report to the MD.

The MTC server can transmit the foregoing information to MD in numerous ways, for example, in a short message or signaling or in another user plane based method or like, and preferably the MTC server transmits the information of the first location and the information of the event report to the MD particularly in a short message.

In an implementation, the MTC server can transmit the information of the first location and the information of the event report to the MD after registration with the MTC server in a PDP context activation procedure in a UMTS system; or after registration with the MTC server after an attachment procedure in an LTE system; or after registration with the MTC server after a PDN connection request procedure in an LTE system.

In an implementation, there can be further included that:

The MTC server determines a second location where the MD is allowed to reside; and The MTC server transmits information of the second location to the MD.

In an implementation, there can be further included that:

The MTC server receives the event report reported from the MD to the MTC server or the event report reported to the MTC server through another device.

In order to facilitate understanding of a technical solution according to an embodiment of the invention, the following description will be given of an implementation in which both the MD and the MTC server cooperate. A method of a Machine Type Communication (MTC) monitoring process will be described particularly by way of an example where the MTC server transmits the information of the first location and the information of the event report to the MD particularly in a short message and the MD reports the event report to the MTC server particularly in a short message. In an implementation, the information can be transmitted in signaling or in another user plane based method in addition to a short message.

Figure 6:
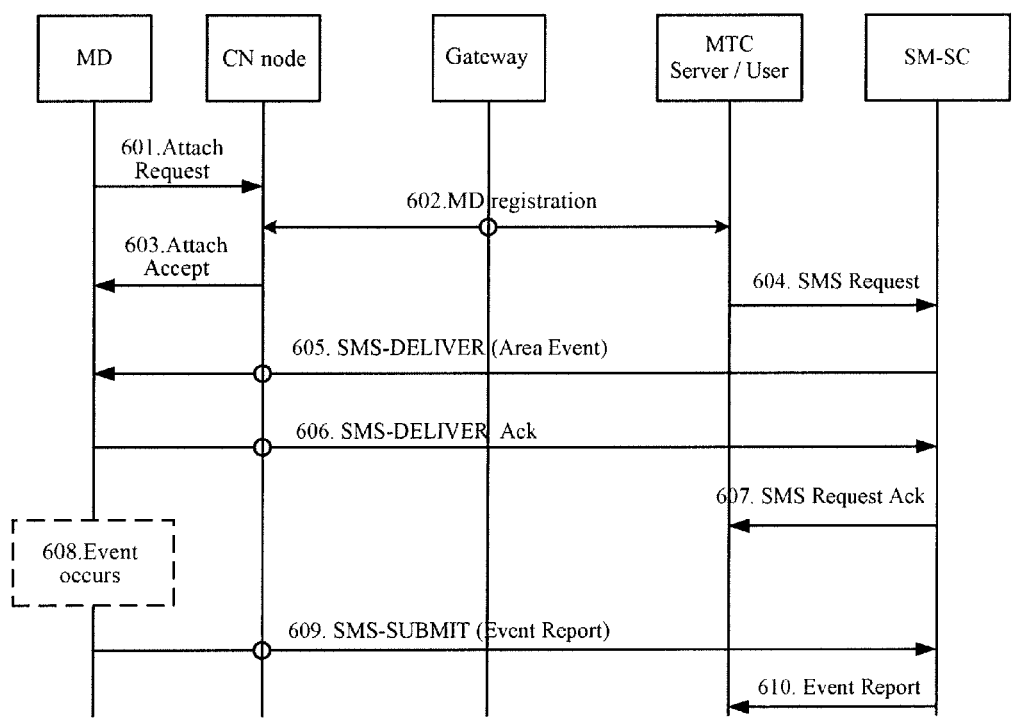
FIG. 6 is a schematic diagram of MD based detection of a change of access point in an embodiment of the invention.

FIG. 6 is a schematic diagram of MD-based detection of a change in point of attachment, and this solution can be applicable to 2G, 3G and LTE systems, and a specific flow thereof is as illustrated in FIG. 6, where an CN node is an MSC in a 2G system, an MSC or an SGSN in a 3G system and an MME in an LTE system; and a gateway is a device connecting an operator core network with the MTC server.

Step 601: The MD transmits an Attach Request to the network for an access to the network;

Step 602: The CN node sets up a bearer channel for communication between the MD and the MTC server for the MD to register with the MTC server;

Step 603: The CN node returns an Attach Accept message to the MD if the MD is allowed to access the network according to subscription information and configuration;

Step 604: The MTC server transmits information of an allowed location area of the MD and information related to an event report to a Short Message Service Center (SM-SC) after the MD registers with the MTC server;

Step 605: The SM-SC transmits to the MD a short message carrying the information of the allowed location area and the information related to the event report;

Step 606: The MD returns a short message reception response;

Step 607: The SM-SC returns a response to the MTC server;

Step 608: The MD stores the information of the allowed location area and the information related to the event report and monitors whether terminal leaves from the allowed location area according to the information;

Step 609: The MD transmits the event report to the SM-SC upon occurrence of an event to be detected; and Step 610: The SM-SC transmits the event report to the MTC server.

Figure 7:
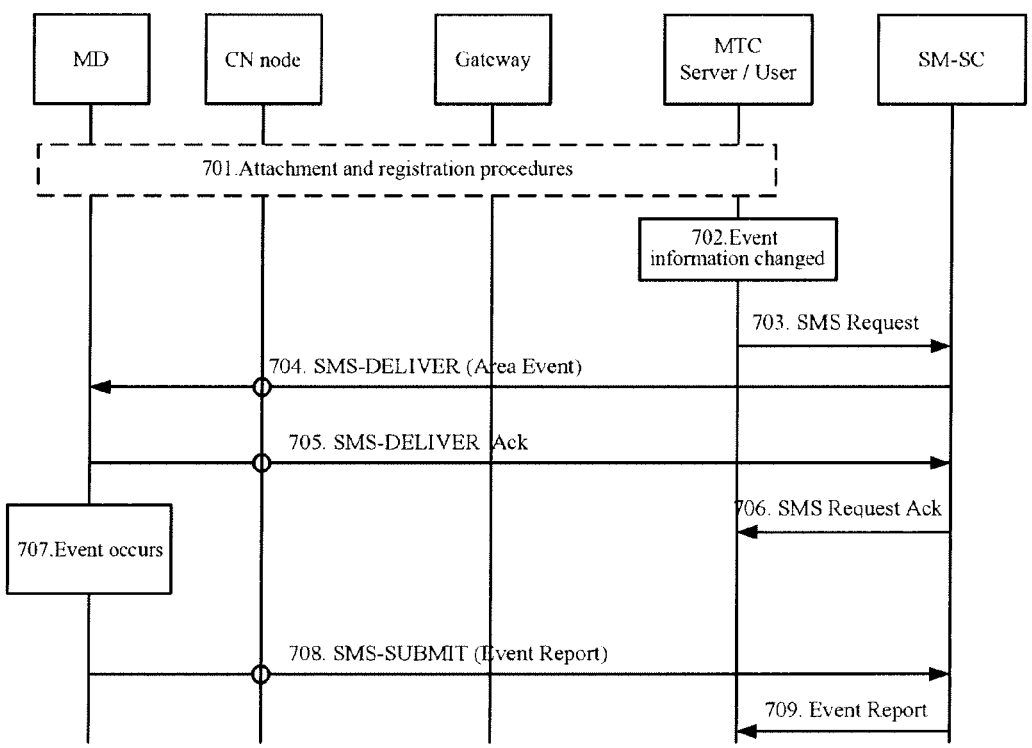
FIG. 7 is a schematic flow chart of performing a procedure to update an allowed location area in an embodiment of the invention.

FIG. 7 is a schematic flow chart of performing a procedure to update an allowed location area, and the MTC can transmit a short message to the MD to update information of an allowed location if the location is changed after the MD registers with the network, and a flow of this procedure is set forth as follows:

Step 701: The MD is attached to the network and registers with the MTC server. Reference can be made for the implementation flow of FIG. 6 for an implementation of this step;

Step 702: The information of the allowed location of the MD, or a mode in which the event is reported, stored in the MTC server is changed;

Steps 703 to 709: The MTC server transmits the changed information to the MD in a short message, and reference can be made to the steps 604 to 610 in FIG. 6 for an implementation thereof.

The following description will be given in specific embodiments, and a method of a Machine Type Communication (MTC) monitoring process will be described by way of an example where the MTC server transmits the information of the first location and the information of the event report to the MD particularly in a short message and the MD reports the event report to the MTC server particularly in a short message. Here the information can be transmitted in signaling or in another user plane based method in addition to a short message.

First Embodiment

Figure 8:
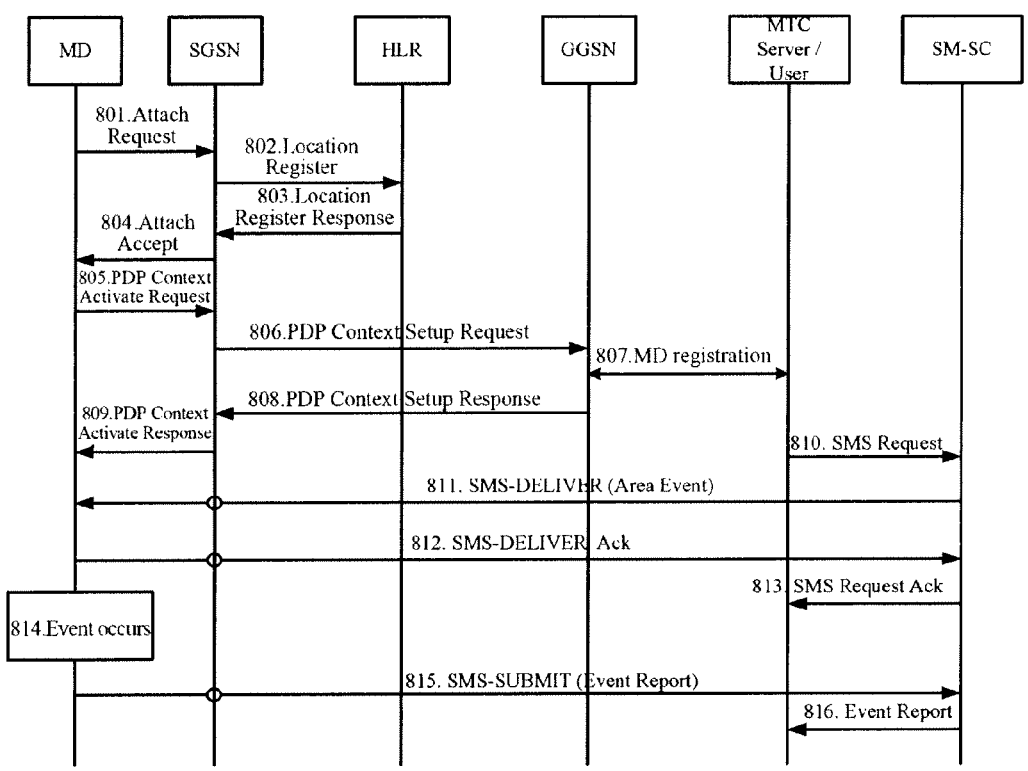
FIG. 8 is a schematic flow chart of performing a method of an MTC monitoring process in the first embodiment of the invention.

FIG. 8 is a schematic flow chart of performing a method of an MTC monitoring process in a first embodiment of the invention, where the MD operates in an UMTS system, the CN node is an SGSN, the gateway node is a Gateway GPRS Support Node (GGSN), and the subscription data server is an HLR. The MD being powered on firstly performs an attachment procedure and then initiates a PDP Context Setup Request for setting up a connection to the MTC server, and immediately the MTC server transmits information of an allowed location. In this example, the information of the location is at a cell level, i.e., {cell ID1, cell ID2, cell ID3}. Then the procedure is as illustrated in FIG. 8, particularly as follows:

Step 801: The MD is powered on and initiates an Attach Request;

Step 802: The SGSN transmits a Location Register Request to the HLR;

Step 803: The HLR returns to the SGSN a response carrying subscription data of the MD;

Step 804: The SGSN returns an Attach Accept message if the MD is allowed to access the network according to the subscription data;

Step 805: The MD initiates a PDP Context Activate Request to the network for setting up a connection to the MTC server;

Step 806: The SGSN transmits a PDP Context Setup Request to the gateway device GGSN;

Step 807: The GGSN interacts with the MTC server for transport of information related to the MD; and the MTC server returns a response message to the GGSN if it allows registration of the MD;

Step 808: The GGSN returns a PDP Context Setup Response to the SGSN;

Step 809: The SGSN returns a PDP Context Activate Response to the MD for communication between the MD and the MTC server.

Step 810: The MTC server transmits information of an allowed location, i.e., {cell ID1, cell ID2, cell ID3}, to the MD after the MD registers therewith. The MTC server transmits the related information to the SM-SC, which in turn transmits it in the form of a short message;

Step 811: The SM-SC transmits the short message to the MD through the SGSN;

Step 812: The MD returns a response.

Step 813: SM-SC returns a response.

Step 814: The MD parses the short message upon reception thereof, stores the information of the location therein and detects its absence in the allowed location area as required. Specifically, if the MD detects that a cell ID of a cell where it currently resides is not in the set {cell ID1, cell ID2, cell ID3} of the allowed location area, then it proceeds to the next step; otherwise, it proceeds with detection;

Step 815: The MD transmits information of an event detected in a short message; and Step 816: The SM-SC transmits the information to the MTC server.

The step 810 can be performed immediately after the step 807 is performed, that is, the MD registers with the MTC server, in the foregoing procedure.

In this way the procedure for the MTC server to transmit the information of the event to be detected and for the MD to detect and report it has been performed.

Second Embodiment

Figure 9:
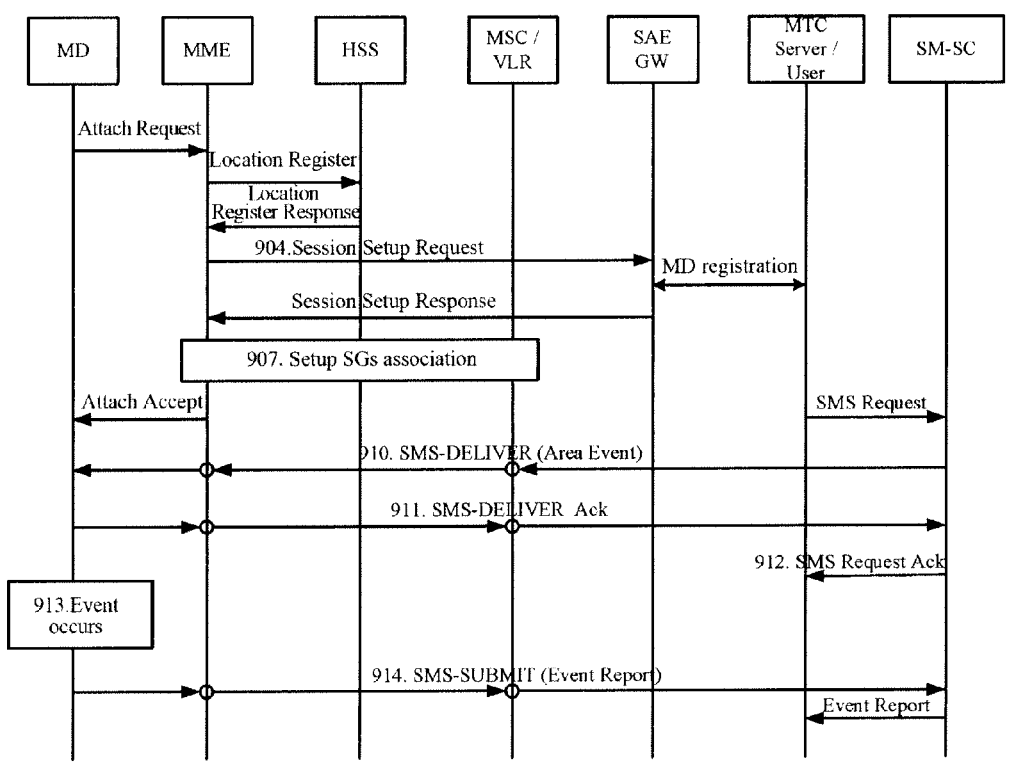
FIG. 9 is a schematic flow chart of performing a method of an MTC monitoring process in the second embodiment of the invention.

FIG. 9 is a schematic flow chart of performing a method of an MTC monitoring process in a second embodiment of the invention, where the MD operates in an LTE system, the CN node is an MME, the gateway node is a System Architecture Evolution (SAE) Gateway (GW), and the subscription data server is an HSS. The MD can set up a default PDN connection upon attachment to the network with the default PDN connection being a connection to the MTC server. Since there is no Circuit Switched (CS) domain in an E-UTRAN, a short message will be transported via an SGs interface between the MME and the MSC/VLR in the LTE system, and an association over this interface will be set up in an attachment procedure.

Assumed an allowed location area which is set by the MTC server for the MD be at a TA level {TA_1}. The MD performs the following procedure after being powered on:

This procedure is different from the first embodiment in the following several steps, and reference can be made to the implementation of the first embodiment for other steps, a repeated description of which will be omitted here.

Step 904: The MME initiates a Session Setup Request to the gateway SAE GW for setting up a connection to the MTC server upon reception of the response message returned from the HSS;

Step 907: The MME sets up an SGs association with the MSC/VLR, that is, sets up a channel over which a short message is transmitted between the MME and the MSC, before returning an Attach Accept message;

Step 910: The SM-SC transmits a short message to the MSC, which forwards it to the MME and then the MD, because there is no CS domain in the E-UTRAN;

Step 913: The MD stores the information of the allowed location area {TA_1}, detects whether a Tracking Area ID (TAI) of a cell where it currently resides is TA_1, and when the TAI is not TA_1, it proceeds to the next step; otherwise, it proceeds with detection; and Steps 911 to 914: A short message transmitted from the MD also arrives at the SM-SC via the SGs interface between the MME and the MSC when the MD returns an SMS-Deliver (SMS stands for Short Message Service) response or the event report.

Third Embodiment

Figure 10:
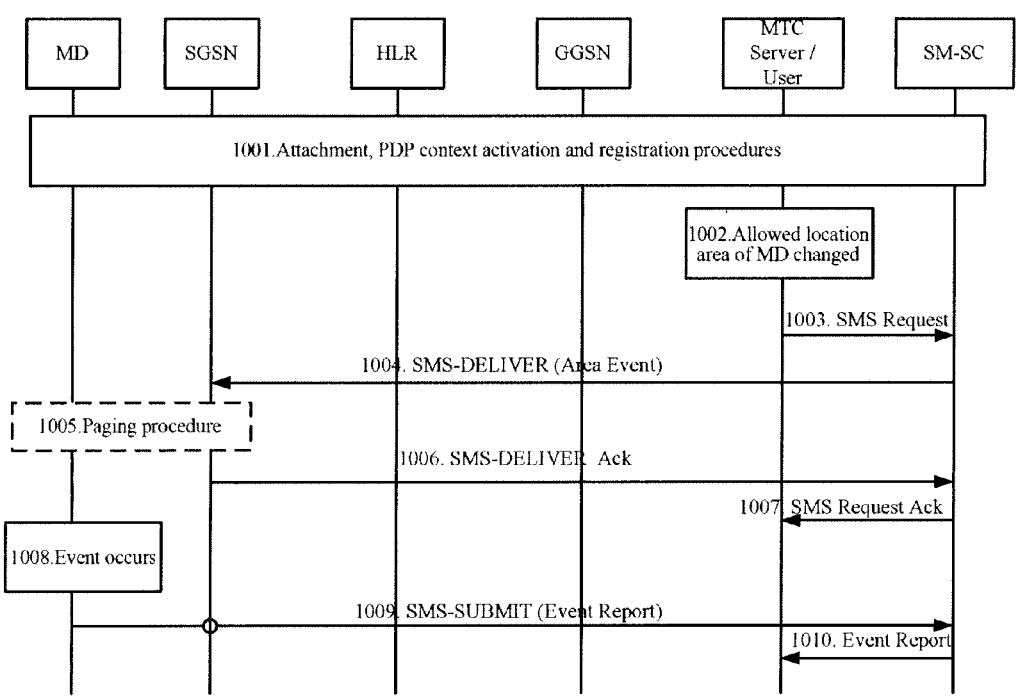
FIG. 10 is a schematic flow chart of performing a method of an MTC monitoring process in the third embodiment of the invention.

FIG. 10 is a schematic flow chart of performing a method of an MTC monitoring process in a third embodiment of the invention, where the UE has been attached to the UMTS network and registered with the MTC server as described in the first embodiment. Thereafter an allowed location area of the MD configured in the MTS server is changed, and the MTC server is triggered to transmit a short message again to the MD to update information of the location area, and as illustrated, this procedure is as follows:

Step 1001: The MD is attached to the network, registers with the MTC server through PDP context activation and has started event detection based upon initially acquired information of an allowed location area as described in the first embodiment;

Step 1002: The allowed location area of the MD is changed due to configuration by the MTC user or another reason;

Step 1003: The MTC server transmits relevant information (including the identifier of the update location area and other relevant information) to the SM-SC, which in turn transmits it in the form of a short message;

Step 1004: The SM-SC transmits the short message to the SGSN;

Step 1005: If the MD is in an idle mode at this time, then a paging procedure is performed to setup a connection of the MD to the network and then the short message is transmitted to the MD; or if the MD has already been in a connected status, then the short message is transmitted directly to the MD;

Steps 1006 to 1007: There is a responding procedure;

Step 1008: The MD monitors based upon the updated location area; and

Steps 1009 to 1010: The MD transmits the event report to the MTC server through the SM-SC upon detecting leaving from the updated location area.

With the foregoing implementation, the MTC user/the MTC server can be enabled to alter an allowed location area of the MD and to notify the MD.

There is further provided in an embodiment of the invention another method of a machine Type Communication (MTC) monitoring process, which includes the following steps:

A MTC Device (MD) receives information of a first location and information of an event report transmitted from a Machine Type Communication (MTC) server, where the first location is a location where the MD is allowed to reside, and the event report is an event report to be made when the MD is present at the first location; and The MD reports the event report to the MTC server upon detecting presence at the first location according to the information of the first location.

Preferably the MD receives the information of the first location and the information of the event report transmitted from the MTC server after the MD registers with the MTC server in a Packet Data Protocol (PDP) context activation procedure in a Universal Mobile Telecommunication System (UMTS) system; or after the MD registers with the MTC server after performing an attachment procedure in a Long Term Evolution (LTE) system; or after the MD registers with the MTC server after performing a Packet Data Network (PDN) connection request procedure in an LTE system.

Preferably there can be further included that:

The MD receives information of a second location transmitted from the MTC server; and The MD updates the information of the first location with the information of the second location.

Preferably the MD reports the event report to the MTC server upon detecting presence at the first location according to the information of the first location particularly as follows:

The MD reports the event report to the MTC server upon detecting presence of the MD at the first location according to the information of the first location in a cell selection or reselection procedure.

Preferably the first location is represented in any one or combination of the following smallest location units:

A cell, a Tracking Area (TA), a Routing Area (RA), a Location Area (LA) and a longitude and a latitude.

Preferably the MD reports the event report to the MTC server as follows:

The MD reports the event report directly to the MTC server; or

The MD reports the event report to the MTC server through another device.

Preferably the MD receives the information of the first location and the information of the event report transmitted from the MTC server particularly in a short message; and The MD reports the event report to the MTC server particularly in a short message.

There is further provided in an embodiment of the invention another method of an MTC monitoring process, which includes the following steps:

An MTC server determines a first location where an MD is allowed to reside and an event report to be made when the MD is present at the first location; and The MTC sever transmits information of the first location and information of the event report to the MD.

Preferably the MTC server transmits the information of the first location and the information of the event report to the MD after the MD registers with the MTC server in a PDP context activation procedure in a UMTS system; or after the MD registers with the MTC server after performing an attachment procedure in an LTE system; or after the MD registers with the MTC server after performing a PDN connection request procedure in an LTE system.

Preferably there can be further included that:

The MTC server determines a second location where the MD is allowed to reside; and The MTC server transmits information of the second location to the MD.

Preferably the first location is represented in any one or combination of the following smallest location units: a cell, a Tracking Area (TA), a Routing Area (RA), a Location Area (LA) and a longitude and a latitude.

Preferably there can be further included that:

The MTC server receives the event report reported from the MD to the MTC server or the event report reported from the MD to the MTC server through another device.

Preferably the MTC server transmits the information of the first location and the information of the event report to the MD particularly in a short message.

The foregoing second method of a Machine Type Communication (MTC) monitoring process is different from the first method of a Machine Type Communication (MTC) monitoring process, in a different configured condition to report an event.

Specifically, an event can be configured in view of a demand of an application to be made upon presence at a first location, for example, in order to locate a terminal or to charge a terminal in different areas, or an event can be configured in view of a demand of an application to be made upon absence from a first location, for example, in order to monitor a terminal for security, and scenarios in which an event is reported upon presence at or absence from a first location will not be limited thereto but other scenarios are also possible. Reference can be made to the first method of an MTC monitoring process for specific details of reporting an event upon presence at a first location.

Based upon the same inventive idea, there is further provided in embodiments of the invention a machine type communication device and a machine type communication server, and since these apparatuses address the problem under a similar principle to the method of an MTC monitoring process, reference can be made to the implementations of the method for implementation of the apparatuses, a repeated description of which will be omitted here.

Figure 11:
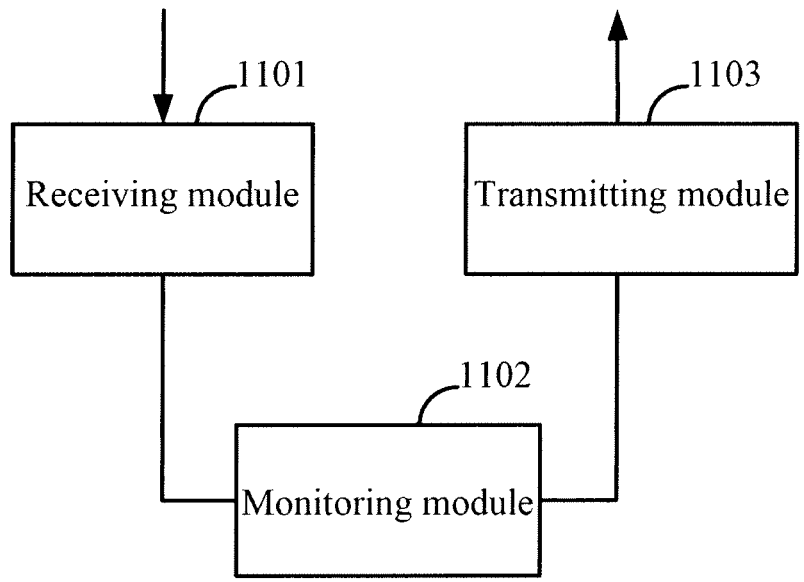
FIG. 11 is a schematic structural diagram of a machine type communication device in an embodiment of the invention.

FIG. 11 is a schematic structural diagram of a machine type communication device, and as illustrated, the MD can include:

A receiving module 1101 configured to receive information of a first location and information of an event report transmitted from an MTC server, where the first location is a location where the MD is allowed to reside, and the event report is an event report to be made when the MD is absent from the first location;

A monitoring module 1102 configured to monitor whether the MD is absent from the first location according to the information of the first location; and A transmitting module 1103 configured to report the event report to the MTC server upon detecting absence of the MD from the first location.

In an implementation, the receiving module can be further configured to receive the information of the location and the information of the event report transmitted from the MTC server after registration with the MTC server in a PDP context activation procedure in a UMTS system; or to receive the information of the location and the information of the event report transmitted from the MTC server after registration with the MTC server after an attachment procedure in an LTE system; or to receive the information of the location and the information of the event report transmitted from the MTC server after registration with the MTC server after a PDN connection request procedure in an LTE system.

In an implementation, the receiving module can be further configured to receive information of a second location transmitted from the MTC server; and The monitoring module can be further configured to update the information of the first location with the information of the second location.

In an implementation, the monitoring module can be further configured to monitor whether the MD is absent from the first location according to the information of the first location in a cell selection or reselection procedure; and The transmitting module can be further configured to report the event report to the MTC server upon detecting absence of the MD from the first location.

In an implementation, the transmitting module can be further configured to report the event report directly to the MTC server; or to report the event report to the MTC server through another device.

Figure 12:
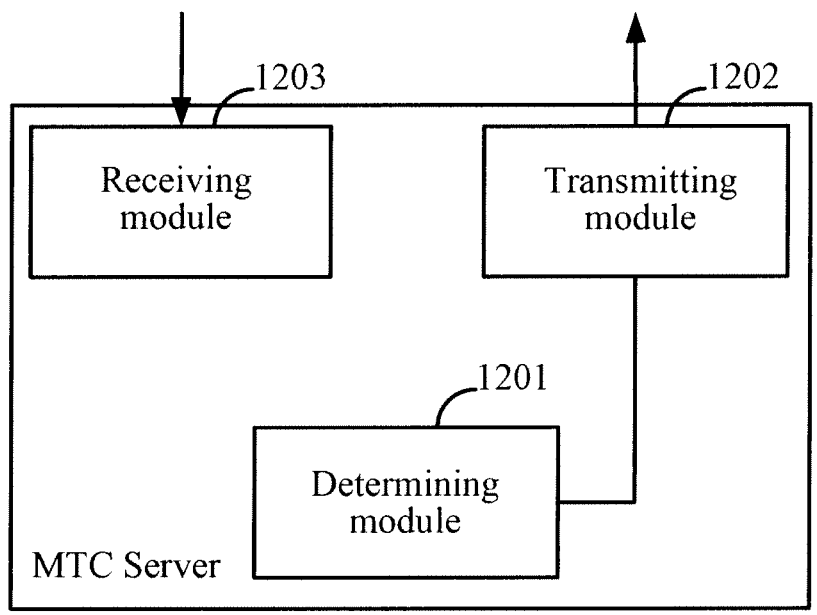
FIG. 12 is a schematic structural diagram of a machine type communication server in an embodiment of the invention.

FIG. 12 is a schematic structural diagram of a machine type communication server, and as illustrated, the MTC server can include:

A determining module 1201 configured to determine a first location where an MD is allowed to reside and an event report to be made when the MD is absent from the first location; and A transmitting module 1202 configured to transmit information of the first location and information of the event report to the MD.

In an implementation, the transmitting module can be further configured to transmit the information of the first location and the information of the event report to the MD after registration with the MTC server in a PDP context activation procedure in a UMTS system; or to transmit the information of the first location and the information of the event report to the MD after registration with the MTC server after an attachment procedure in an LTE system; or to transmit the information of the first location and the information of the event report to the MD after registration with the MTC server after a PDN connection request procedure in an LTE system.

In an implementation, the determining module can be further configured to determine second location where the MD is allowed to reside; and The transmitting module can be further configured to transmit information of the second location to the MD.

In an implementation, the determining module can be further configured to determine the first location to be represented in any one or combination of the following smallest location units:

A cell, a Tracking Area (TA), a Routing Area (RA), a Location Area (LA) and a longitude and a latitude.

In an implementation, the server can further include:

A receiving module 1203 configured to receive the event report reported from the MD to the MTC server or the event report reported to the MTC server through another device.

There is further provided in an embodiment of the invention another machine type communication device including:

A receiving module configured to receive information of a first location and information of an event report transmitted from an MTC server, where the first location is a location where the MD is allowed to reside, and the event report is an event report to be made when the MD is present at the first location;

A monitoring module configured to monitor whether the MD is present at the first location according to the information of the first location; and A transmitting module configured to report the event report to the MTC server upon detecting presence of the MD at the first location.

In an implementation, the receiving module can be further configured to receive the information of the location and the information of the event report transmitted from the MTC server after registration with the MTC server in a PDP context activation procedure in a UMTS system; or to receive the information of the location and the information of the event report transmitted from the MTC server after registration with the MTC server after an attachment procedure in an LTE system; or to receive the information of the location and the information of the event report transmitted from the MTC server after registration with the MTC server after a PDN connection request procedure in an LTE system.

In an implementation, the receiving module can be further configured to receive information of a second location transmitted from the MTC server; and The monitoring module can be further configured to update the information of the first location with the information of the second location.

In an implementation, the monitoring module can be further configured to monitor whether the MD is present at the first location according to the information of the first location in a cell selection or reselection procedure; and The transmitting module can be further configured to report the event report to the MTC server upon detecting presence of the MD at the first location.

In an implementation, the transmitting module can be further configured to report the event report directly to the MTC server; or to report the event report to the MTC server through another device.

There is further provided in an embodiment of the invention another machine type communication server including:

A determining module configured to determine a first location where an MD is allowed to reside and an event report to be made when the MD is present at the first location; and A transmitting module configured to transmit information of the first location and information of the event report to the MD.

In an implementation, the transmitting module can be further configured to transmit the information of the first location and the information of the event report to the MD after the MD registers with the MTC server in a PDP context activation procedure in a UMTS system; or to transmit the information of the first location and the information of the event report to the MD after the MD registers with the MTC server after an attachment procedure in an LTE system; or to transmit the information of the first location and the information of the event report to the MD after the MD registers with the MTC server after a PDN connection request procedure in an LTE system.

In an implementation, the determining module can be further configured to determine second location where the MD is allowed to reside; and The transmitting module can be further configured to transmit information of the second location to the MD.

In an implementation, the determining module can be further configured to determine the first location to be represented in any one or combination of the following smallest location units:

A cell, a Tracking Area (TA), a Routing Area (RA), a Location Area (LA) and a longitude and a latitude.

In an implementation, there is further included:

A receiving module configured to receive the event report reported from the MD to the MTC server or the event report reported to the MTC server through another device.

For the convenience of a description, the respective components of the foregoing apparatuses have been described respectively by functionally dividing them into respective modules or units. Of course the functions of the respective modules or units can be performed in the same one or a plurality of items of software or hardware to put the invention into practice.

As can be apparent from the foregoing implementations, an MTC server transmits information of an allowed location area to an MD, and the MD monitors whether it is absent from the location area and transmits an event report to the MTC server upon occurrence of an event.

Specifically the MTC server can transmit a notification after the MD registers with the MTC server. A registration procedure is performed in a UMTS system in a PDP context activation procedure and in an LTE system in an attachment procedure or a PDN connection request procedure.

The MTC server updates the information of the allowed location area stored at the MD if the location area of the MD is changed.

The MD can report the event report to the MTC server in numerous ways, for example, in a short message or signaling or in another user plane based method or like, and the MTC server can transmit the foregoing information to the MD in numerous ways, for example, in a short message or signaling or in another user plane based method or like. Preferably an MTCsms interface is enabled between the MTC server and an SM-SC, and an SME function is performed in the MTC server.

Specifically the MD detects whether a current location area belongs to the allowed location area in a cell selection or reselection cell, and if not so, then the MD transmits the event report.

Preferably the MD is required to perform an SME function to transmit and receive a short message; and the MD is required to perform a function to download a (U)SIM application and a function to interact with an MT in a USAT command.

In the technical solution according to the embodiments of the invention, an event to be detected is transmitted from the MTC server to the MD in a short message without any modification to subscription data of the MD, and also the MD is updated from the MTC server in a short message upon change to the event to be detected. As compared with the existing SGSN/MME based detection method, the present solution eliminates the need of an interface between an MTC server and an HSS and also the need for the HSS/HLR to notify a core network node of the updated event to be detected upon change to the event, thereby reducing interfaces and operations between other network nodes and the HSS/HLR and maintaining the stability of the HSS/HLR.

Furthermore, the network can know the location where the terminal resides only at the granularity of a list of RAs or TAIs but can not acquire a cell where the terminal currently resides and other more detailed information of the location of the terminal in the existing system, thus increasing the complexity of the network in the method where it is detected by the network. In the present solution, the terminal can report an event on its own initiative upon detecting movement out of the allowed are even if the terminal selects and reselects a cell in an idle mode, thereby making full use of the characteristic of the terminal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The invention claimed is:

1. A method of a Machine Type Communication, MTC, monitoring process, comprising the following steps:
receiving, by an MTC Device, MD, information of a first location and information of an event report transmitted from an MTC server, wherein the first location is a location where the MD is allowed to reside, and the event report is an event report to be made when the MD is absent from the first location;
monitoring, by the MD, whether the MD is absent from the first location according to the information of the first location; and
reporting, by the MD, the event report to the MTC server upon detecting absence from the first location according to the information of the first location.

2. The method according to claim 1, wherein the MD receives the information of the first location and the information of the event report transmitted from the MTC server:
after the MD registers with the MTC server in a Packet Data Protocol, PDP, context activation procedure in a Universal Mobile Telecommunication System, UMTS, system; or
after the MD registers with the MTC server after performing an attachment procedure in a Long Term Evolution, LTE, system; or
after the MD registers with the MTC server after performing a Packet Data Network, PDN, connection request procedure in an LTE system.

3. The method according to claim 1, further comprising:
receiving, by the MD, information of a second location transmitted from the MTC server; and
updating, by the MD, the information of the first location with the information of the second location.

4. The method according to claim 1, wherein the steps of monitoring and reporting are performed in a cell selection or reselection procedure.

5. The method according to claim 1, wherein the first location is represented in any one or combination of the following smallest location units:
a cell, a Tracking Area, TA, a Routing Area, RA, a Location Area, LA, and a longitude and a latitude.

6. The method according to claim 1, wherein reporting, by the MD, the event report to the MTC server comprises:
reporting, by the MD, the event report directly to the MTC server; or
reporting, by the MD, the event report to the MTC server through another device.

7. The method according to claim 1, wherein:
the MD receives the information of the first location and the information of the event report transmitted from the MTC server particularly in a short message; and
the MD reports the event report to the MTC server particularly in a short message.

8. A method of a Machine Type Communication, MTC, monitoring process, comprising the following steps:
receiving, by an MTC Device, MD, information of a first location and information of an event report transmitted from an MTC server, wherein the first location is a location where the MD is allowed to reside, and the event report is an event report to be made when the MD is present at the first location;
monitoring, by the MD, whether the MD is present at the first location according to the information of the first location; and
reporting, by the MD, the event report to the MTC server upon detecting presence at the first location.

9. The method according to claim 8, wherein the MD receives the information of the first location and the information of the event report transmitted from the MTC server:
after the MD registers with the MTC server in a Packet Data Protocol, PDP, context activation procedure in a Universal Mobile Telecommunication System, UMTS, system; or
after the MD registers with the MTC server after performing an attachment procedure in a Long Term Evolution, LTE, system; or
after the MD registers with the MTC server after performing a Packet Data Network, PDN, connection request procedure in an LTE system.

10. The method according to claim 8, further comprising:
receiving, by the MD, information of a second location transmitted from the MTC server; and
updating, by the MD, the information of the first location with the information of the second location.

11. The method according to claim 8, wherein the steps of monitoring and reporting are performed in a cell selection or reselection procedure.

12. The method according to claim 8, wherein the first location is represented in any one or combination of the following smallest location units:
a cell, a Tracking Area, TA, a Routing Area, RA, a Location Area, LA, and a longitude and a latitude.

13. The method according to claim 8, wherein the reporting, by the MD, the event report to the MTC server comprises:
reporting, by the MD, the event report directly to the MTC server; or
reporting, by the MD, the event report to the MTC server through another device.

14. The method according to claim 8, wherein:
the MD receives the information of the first location and the information of the event report transmitted from the MTC server particularly in a short message; and
the MD reports the event report to the MTC server particularly in a short message.

15. A Machine Type Communication device, MD, comprising:
a memory device having instructions stored thereon; and
a computer processor that, upon executing the instructions, performs the following:
receiving information of a first location and information of an event report transmitted from a Machine Type Communication, MTC, server, wherein the first location is a location where an MTC Device, MD, is allowed to reside, and the event report is an event report to be made when the MD is absent from the first location or when the MD is present at the first location;

monitoring whether the MD is absent from the first location according to the information of the first location; and reporting the event report to the MTC server upon detecting absence of the MD from the first location or detecting presence of the MD at the first location.

16. The device according to claim 15, wherein the MD receives the information of the first location and the information of the event report transmitted from the MTC server:

after the MD registers with the MTC server in a Packet Data Protocol, PDP, context activation procedure in a Universal Mobile Telecommunication System, UMTS, system;

after the MD registers with the MTC server after an attachment procedure in a Long Term Evolution, LTE, system; or after the MD registers with the MTC server after a Packet Data Network, PDN, connection request procedure in an LTE system.

17. The device according to claim 15, wherein the computer processor, upon executing the instructions, further performs:

receiving information of a second location transmitted from the MTC server; and updating the information of the first location with the information of the second location.

18. The device according to claim 15, wherein the monitoring whether the MD is absent from the first location according to the information of the first location comprises:

monitoring whether the MD is absent from the first location according to the information of the first location in a cell selection or reselection procedure.

19. The device according to claim 15, wherein the reporting the event report to the MTC server comprises: reporting the event report directly to the MTC server or reporting the event report to the MTC server through another device.

* * * * *